(12) United States Patent
Choi et al.

(10) Patent No.: US 12,436,685 B2
(45) Date of Patent: Oct. 7, 2025

(54) MEMORY DEVICE FOR PERFORMING PROGRAM OPERATION ACCORDING TO INCREMENTAL STEP PULSE PROGRAMMING METHOD, STORAGE DEVICE INCLUDING THE SAME, AND OPERATING METHOD OF THE MEMORY DEVICE

(71) Applicant: SK hynix Inc., Icheon-si (KR)

(72) Inventors: Hyung Jin Choi, Icheon-si (KR); Gwi Han Ko, Icheon-si (KR); Chan Hui Jeong, Icheon-si (KR); Se Chun Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 238 days.

(21) Appl. No.: 18/312,459

(22) Filed: May 4, 2023

(65) Prior Publication Data

US 2024/0176503 A1    May 30, 2024

(30) Foreign Application Priority Data

Nov. 29, 2022 (KR) .......................... 10-2022-0162904

(51) Int. Cl.
*G11C 16/04* (2006.01)
*G06F 3/06* (2006.01)

(52) U.S. Cl.
CPC .......... *G06F 3/0619* (2013.01); *G06F 3/0659* (2013.01)

(58) Field of Classification Search
CPC ............................ G06F 3/0619; G06F 3/0659
See application file for complete search history.

(56) References Cited

U.S. PATENT DOCUMENTS 9,842,659 B2 * 12/2017 Nam .................... G11C 29/025
10,061,633 B2 * 8/2018 Yim .................. G11C 16/3459
11,508,443 B2 * 11/2022 Park ........................ G11C 16/26

FOREIGN PATENT DOCUMENTS

| KR | 1020120060761 A | 6/2012 |
|---|---|---|
| KR | 1020130006300 A | 1/2013 |
| KR | 101785448 B1 | 10/2017 |
| KR | 1020220107578 A | 8/2022 |

\* cited by examiner

*Primary Examiner* — Pho M Luu
(74) *Attorney, Agent, or Firm* — WILLIAM PARK AND ASSOCIATES LTD.

(57) ABSTRACT

A memory device includes: a plurality of memory cells; a peripheral circuit configured to perform a plurality of program loops each including a program voltage apply operation of applying a program voltage to selected memory cells, and a verify operation of verifying a program state of the selected memory cells; and a control logic configured to control the peripheral circuit to apply program voltages increasing in a step-wise manner by a first step voltage in program loops in a first state, and increasing by a second step voltage that is lower than the first step voltage in program loops in a second state that occur after the program loops in the first state. The first state and the second state of the program loops are determined based on when a verify operation on a program state having a highest threshold voltage is performed.

20 Claims, 9 Drawing Sheets

MEMORY DEVICE FOR PERFORMING PROGRAM OPERATION ACCORDING TO INCREMENTAL STEP PULSE PROGRAMMING METHOD, STORAGE DEVICE INCLUDING THE SAME, AND OPERATING METHOD OF THE MEMORY DEVICE

CROSS-REFERENCE TO RELATED APPLICATION

The present application claims priority under 35 U.S.C. § 119(a) to Korean patent application number 10-2022-0162904 filed on Nov. 29, 2022, in the Korean Intellectual Property Office, the entire disclosure of which is incorporated by reference herein.

BACKGROUND

1. Technical Field

The present disclosure generally relates to an electronic device, and more particularly, to a memory device for performing a program operation according to an incremental step pulse programming method, a storage device including the same, and an operating method of the memory device.

2. Related Art

A storage device is a device that stores data under the control of a host device, such as a computer or a smart phone. The storage device may include a memory device for storing data and a memory controller for controlling the memory device. The memory device is classified into a volatile memory device and a nonvolatile memory device.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

An Incremental Step Pulse Programming (ISPP) method has been known as a programming method of the nonvolatile memory device. The ISPP method is a method of performing a program operation while constantly increasing the program voltage that is applied by a step voltage. However, when the program operation is performed using the ISPP method, a right tail of a threshold voltage distribution of memory cells increases as a program pulse number increases. When the right tail of the threshold voltage distribution increases, a margin of a pass voltage is decreased, and reliability may be deteriorated in a read operation. Therefore, there is required a programming method of allowing the right tail of the threshold voltage distribution of the memory cells to not excessively increase.

SUMMARY

In accordance with an aspect of the present disclosure, there is provided a memory device including: a plurality of memory cells; a peripheral circuit configured to perform a plurality of program loops each including a program voltage apply operation of applying a program voltage to selected memory cells, among the plurality of memory cells, and a verify operation of verifying a program state of the selected memory cells; and a control logic configured to control the peripheral circuit to apply program voltages increasing in a step-wise manner by a first step voltage in program loops in a first state, among the plurality of program loops, and increasing in a step-wise manner by a second step voltage that is lower than the first step voltage in program loops in a second state that occur after the program loops in the first state, wherein the first state and the second state of the program loops are determined based on when a verify operation on a program state having a highest threshold voltage is performed.

In accordance with another aspect of the present disclosure, there is provided a storage device including: a memory controller configured to control a memory device to perform a program operation, corresponding to a write request, when the write request is received from a host; and the memory device including a plurality of memory cells, the memory device performing the program operation by performing a plurality of program loops each including a program voltage apply operation of applying a program voltage to selected memory cells, among the plurality of memory cells, and a verify operation of verifying a program state of the selected memory cells, wherein the program loops are determined as program loops in a first state or a second state, based on when a verify operation on a program state having a highest threshold voltage is performed, wherein program voltages applied in the first state increase in a step-wise manner by a first step voltage, wherein program voltages applied in the second state increase in a step-wise manner by a second step voltage that is lower than the first step voltage, and wherein the program loops in the second state are performed after the program loops in the first state.

In accordance with still another aspect of the present disclosure, there is provided a method of operating a memory device, the method including: applying a first program voltage of a first program loop to selected memory cells, among a plurality of memory cells, the first program voltage increasing by a first step voltage as compared with a previous program voltage of a previous program loop; performing a verify operation of verifying at least some of a plurality of program states of the selected memory cells; and applying a second program voltage to the selected memory cells, among the plurality of memory cells, the second program voltage increasing by a second step voltage as compared with the first program voltage of the first program loop, based on when a verify operation on a program state having a highest threshold voltage, among the plurality of program states is performed, wherein the second step voltage is lower than the first step voltage.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms and cannot be construed as limited to the embodiments set forth herein.

Embodiments provide a memory device, a storage device including the same, and an operating method of the memory device, which support a program method in which a sufficient margin of a pass voltage can be secured.

Figure 1:
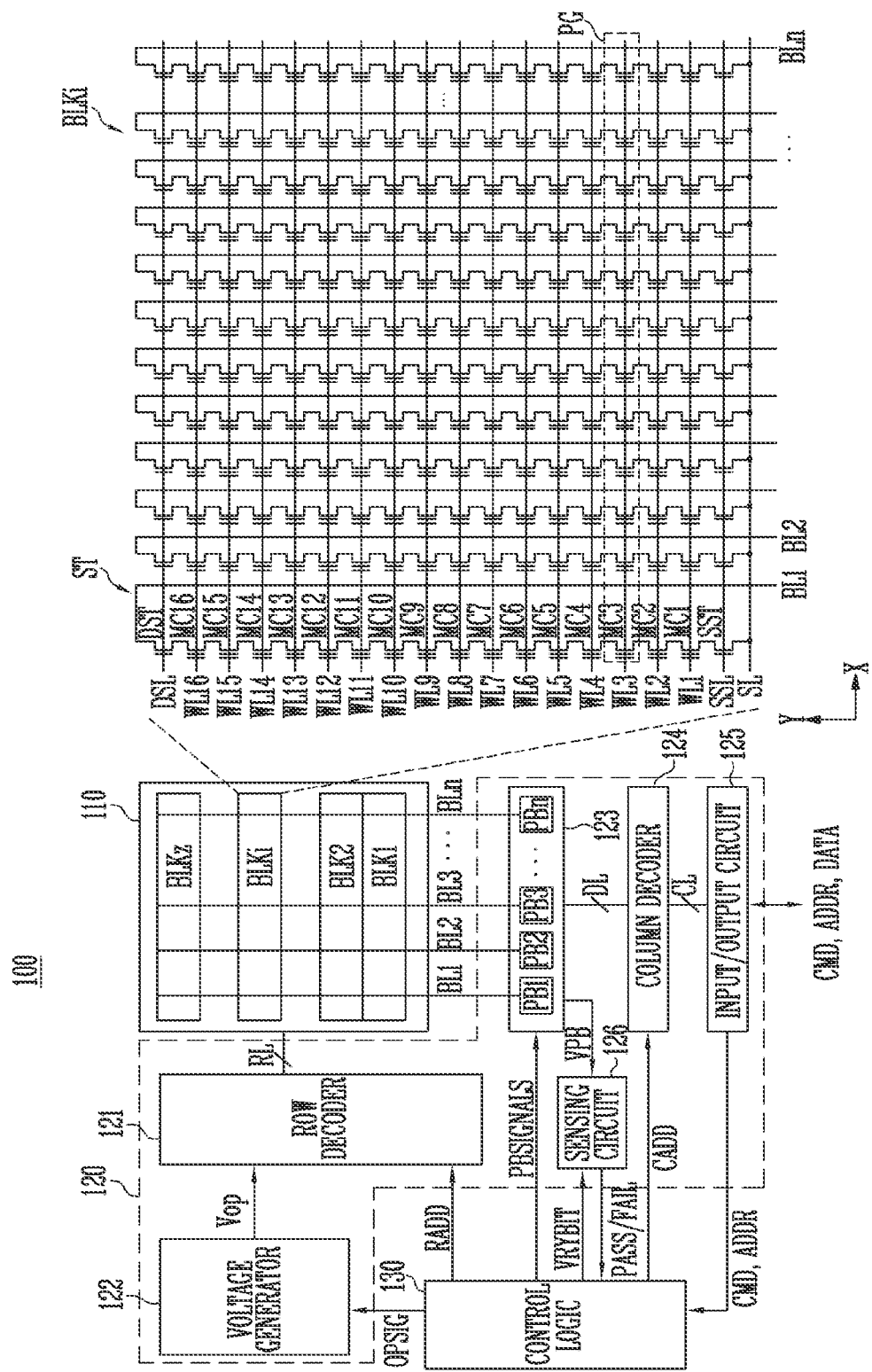
FIG. 1 is a block diagram illustrating a memory device in accordance with an embodiment of the present disclosure.

FIG. 1 is a block diagram illustrating a memory device in accordance with an embodiment of the present disclosure.

Referring to FIG. 1, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be connected to a row decoder 121 through row lines RL. The row lines RL may include at least one source select line, a plurality of word lines, and at least one drain select line. The plurality of memory blocks BLK1 to BLKz may be connected to a page buffer group 123 through bit lines BL1 to BLn. Each of the plurality of memory blocks BLK1 to BLKz may include a plurality of memory cells. In an embodiment, the plurality of memory cells may be nonvolatile memory cells. Memory cells connected to the same word line may be defined as one page. Therefore, one memory block may include a plurality of pages.

In any one memory block BLKi, among the plurality of memory blocks, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be respectively connected to the strings ST, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells F1 to F16, and a drain select transistor DST, which are connected in series to each other between the source line SL and the first bit line BL1. At least one source select transistor SST and at least one drain select transistor DST may be included in one string ST, and memory cells, the number of which is greater than the number of the memory cells F1 to F16, shown in the drawing, may be included in the one string ST.

A source of the source select transistor SST may be connected to the source line SL, and a drain of the drain select transistor DST may be connected to the first bit line BL1. The memory cells F1 to F16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells F1 to F16 may be connected to a plurality of word lines WL1 to WL16. A group of memory cells connected to the same word line, among memory cells included in different strings ST, may be referred to as a physical page PG. Therefore, physical pages PG, the number of which corresponds to the number of the word lines WL1 to WL16, may be included in the memory block BLKi.

Each of the memory cells may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The SLC may store one-bit data. One physical page PG of the SLC may store one logical page (LPG) data. One LPG data may include data bits, the number of which corresponds to the number of cells included in one physical page PG.

The MLC, the TLC, and the QLC may store two-or-more-bit data. One physical page PG may store two or more LPG data.

The peripheral circuit 120 may be configured to perform a program operation, a read operation, or an erase operation on a selected area of the memory cell array 110 under the control of the control logic 130. That is, the peripheral circuit 120 may drive the memory cell array 110 under the control of the control logic 130. For example, the peripheral circuit 120 may apply various operating voltages to the row lines RL and the bit lines BL1 to BLn or may discharge the applied voltages under the control of the control logic 130.

Specifically, the peripheral circuit 120 may include the row decoder 121, a voltage generator 122, the page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate under the control of the control logic 130. The row decoder 121 may receive a row address RADD from the control logic 130. Specifically, the row decoder 121 may decode the row address RADD. The row decoder 121 may select at least one memory block, among the memory blocks BLK1 to BLKz, according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line and may apply a program pass voltage having a level lower than a level of the program voltage to unselected word lines. In a program verify operation, the row decoder 121 may apply a verify voltage to the selected word line and may apply a verify pass voltage that is higher than the verify voltage to the unselected word lines. In a read operation, the row decoder 121 may apply a read voltage to the selected word line and may apply a read pass voltage that is higher than the read voltage.

In an embodiment, an erase operation of the memory device 100 may be performed in a memory block unit. In the erase operation, the row decoder 121 may select one memory block according to the decoded address. In the erase operation, the row decoder 121 may apply a ground voltage to word lines connected to the selected memory block.

The voltage generator 122 may operate under the control of the control logic 130. Specifically, the voltage generator 122 may generate a plurality of voltages by using an external power voltage supplied to the memory device 100 under the control of the control logic 130. For example, the voltage generator 122 may generate a program voltage, a verify voltage, a pass voltage, a read voltage, an erased voltage, and the like under the control of the control logic 130. That is, the voltage generator 122 may generate various operating voltages Vop used in program, read, and erase operations in response to an operation signal OPSIG.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages by using the external power voltage or the internal power voltage. For example, the voltage generator 122 may include a plurality of pumping capacitors for receiving the internal power voltage and may generate the plurality of voltages by selectively activating the plurality of pumping capacitors under the control of the control logic 130. In addition, the plurality of generated voltages may be supplied to the memory cell array 110 by the row decoder 121.

The page buffer group 123 may include first to nth page buffers PB1 to PBn. The first to nth page buffers PB1 to PBn may be connected to the memory cell array 110 through first to nth bit lines BL1 to BLn, respectively. Also, the first to nth bit lines BL1 to BLn may operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn or may sense a voltage or current of the bit lines BL1 to BLn in a read or verify operation.

Specifically, in a program operation, when a program voltage is applied to a selected word line, the first to nth page buffers PB1 to PBn may transfer data received through the input/output circuit 125 to selected memory cells through the first to nth bit lines BL1 to BLn. Memory cells of a selected page may be programmed according to the transferred data. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a program verify operation, the first to nth page buffers PB1 to PBn may read page data from the selected memory cells through the first to nth bit lines BL1 to BLn.

The column decoder 124 may communicate data between the input/output circuit 125 and the page buffer group 123 in response to a column address CADD. For example the column decoder 124 may communicate data with the first to nth page buffers PB1 to PBn through data lines DL or may communicate data with the input/output circuit 125 through column lines CL.

The input/output circuit 125 may transfer a command CMD and an address ADDR, which are received from the memory controller 200, to the control logic 130 or may exchange data with the column decoder 124.

In a read operation or verify operation, the sensing circuit 126 may generate a reference current in response to an allow bit signal VRYBIT and may output a pass signal PASS or a fail signal FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit signal VRYBIT in response to the command CMD and the address ADDR.

Also, the control logic 130 may determine whether the verify operation has passed or failed in response to the pass or fail signal PASS or FAIL. Also, the control logic 130 may control the page buffer group 123 to temporarily store verify information including the pass or fail signal PASS or FAIL in the page buffer group 123. Specifically, the control logic 130 may determine a program state of a memory cell in response to the pass or fail signal PASS or FAIL. For example, when the memory cell operates as a TLC, the control logic 130 may determine whether the program state of the memory cell is an erase state E or any one of first to seventh program states P1 to P7.

In accordance with an embodiment of the present disclosure, the control logic 130 may decrease a magnitude of a step voltage based on a verify time of a program state having a highest threshold voltage (hereinafter, referred to as a highest program state), more specifically, a program loop, among a plurality of program loops, in which a verify operation on the highest program state is performed. Specifically, the control logic 130 may count a number of times a program voltage is applied and may count a program loop number based on the number of times the program voltage is applied. The program loop number may be a number representing the program loops of a program operation being performed.

In accordance with an embodiment of the present disclosure, the control logic 130 may decrease the magnitude of the step voltage from a program loop in which the verify operation on the highest program state is started. That is, the control logic 130 may control the peripheral circuit 120 to apply a program voltage that increases by a second step voltage, which is lower than a first step voltage from a specific program loop. In an embodiment, the control logic 130 may predict, in advance, that the verify operation on the highest program state will be performed in a program loop to be performed at this time. In an embodiment, the control logic 130 may monitor whether a verify operation of verifying each program state of selected memory cells has passed. For example, the control logic 130 may monitor a program loop in which a verify voltage corresponding to a first program state is first applied, a program loop in which a verify voltage corresponding to a second program state is first applied, and a program loop in which a verify voltage corresponding to an nth program state is first applied. When a verify operation of verifying a specific program state passes, the control logic 130 may predict, in advance, that the verify operation on the highest program state will be performed in a next program loop.

In accordance with another embodiment of the present disclosure, the control logic 130 may decrease a magnitude of a step voltage from a next program loop of a program loop in which the verify operation on the highest program state is started. That is, the control logic 130 may control the peripheral circuit 120 to apply a program voltage that increases by a second step voltage, which is lower than a first step voltage from a specific program loop. In an embodiment, the control logic 130 may monitor whether the verify operation on the highest program state has been performed in a program loop previously performed. In an embodiment, the control logic 130 may monitor a program loop number with respect to a program loop in which a verify voltage for verifying each program state of selected memory cells is first applied. For example, the control logic 130 may monitor a program loop in which a verify voltage corresponding to a first program state is first applied, a program loop in which a verify voltage corresponding to a second program state is first applied, and a program loop in which a verify voltage corresponding to an nth program state is first applied. Also, the control logic 130 may check that the verify operation on the highest program state has been performed in a previous program loop based on the monitored program loops.

Figure 2:
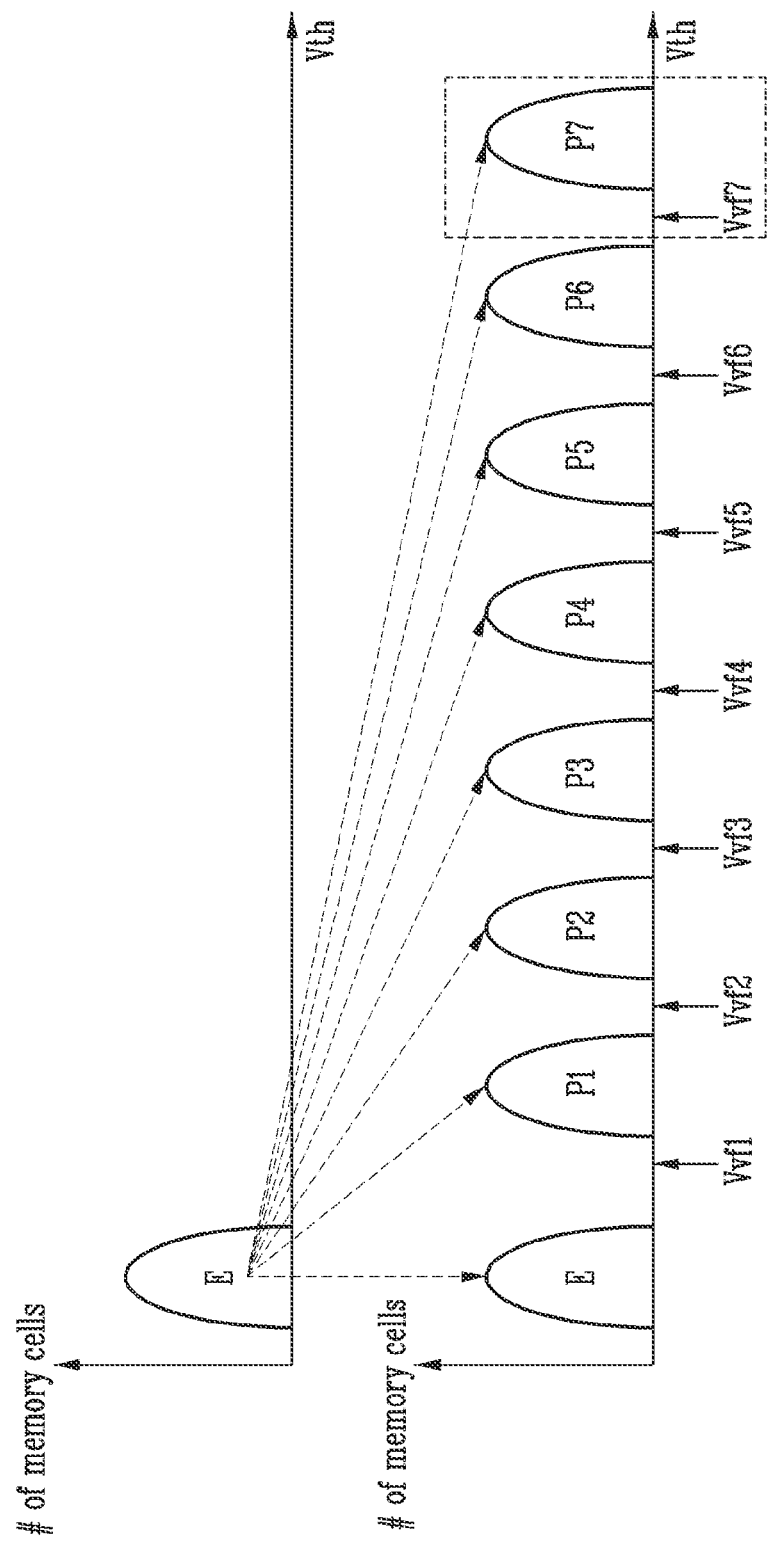
FIG. 2 is a diagram illustrating a program state of a memory cell in accordance with an embodiment of the present disclosure.

FIG. 2 is a diagram illustrating a program state of a memory cell in accordance with an embodiment of the present disclosure.

Referring to FIG. 2, a memory cell may be programmed to an erase state E or any one state, among first to seventh program states P1 to P7, according to a threshold voltage. Although the memory cell, shown in FIG. 2 is illustrated as a Triple Level Cell (TLC) that can be programmed to one erase state or any one state, among seven program states, this is merely an embodiment for convenience of description, and the memory cell may be implemented as a Multi-Level Cell (MLC), a Single Level Cell (SLC), a Quad Level Cell (QLC), or the like. In addition, the erase state and the program state are distinguished from each other for convenience of description, but the erase state may be expressed as a zeroth program state P0. Therefore, the erase stat E and the first to seventh program states P1 to P7, which are shown in FIG. 2, may be expressed as zeroth to seventh program states.

Selected memory cells may have a threshold voltage included in the erase state E or any one state, among the first to seventh program states P1 to P7. That is, the memory cells may be programmed to have a threshold voltage included in the erase state E or any one state, among the first to seventh program states P1 to P7. The memory cells may be in the erase state E before a program operation is performed. In the program operation, the memory cells in the erase state E may be programmed to any one program state, among the seven program states, as a program voltage is applied to a selected word line.

In addition, the erase state E and the first to seventh program states P1 to P7 of memory cells may be distinguished from each other by using verify voltages. Specifically, adjacent program states of memory cells may be distinguished from each other by using verify voltages. For example, the erase state E and the first program state P1 may be distinguished from each other by a first verify voltage Vvf1. The first program state P1 and the second program state P2 may be distinguished from each other by a second verify voltage Vvf2. The second program state P2 and the third program state P3 may be distinguished from each other by a third verify voltage Vvf3. The third program state P3 and the fourth program state P4 may be distinguished from each other by a fourth verify voltage Vvf4. The fourth program state P4 and the fifth program state P5 may be distinguished from each other by a fifth verify voltage Vvf5. The fifth program state P5 and the sixth program state P6 may be distinguished from each other by a sixth verify voltage Vvf6. The sixth program state P6 and the seventh program state P7 may be distinguished from each other by a seventh verify voltage Vvf7.

In accordance with an embodiment of the present disclosure, the seventh program state P7 may be a highest program state. Since the seventh program state P7 can be distinguished by the seventh verify voltage, the memory device 100 may decrease a degree of increase of the program voltage (e.g., a step voltage) based on when a program loop, among a plurality of program loops, in which the seventh verify voltage verifies the seventh program state is performed. In an embodiment, when the seventh verify voltage for verifying the seventh program state is applied from an nth program loop, the memory device 100 may decrease the magnitude of the step voltage from the nth program loop. That is, the memory device 100 may apply a program voltage increasing by a second step voltage that is lower than a first step voltage from the nth program loop. In another embodiment, when the seventh verify voltage for verifying the seventh program state is applied from an nth program loop, the memory device 100 may decrease the magnitude of the step voltage from an (n+1)th program loop, which occurs after the nth program loop. That is, the memory device 100 may apply a program voltage increasing by a second step voltage that is lower than a first step voltage from the (n+1)th program loop.

Figure 3:
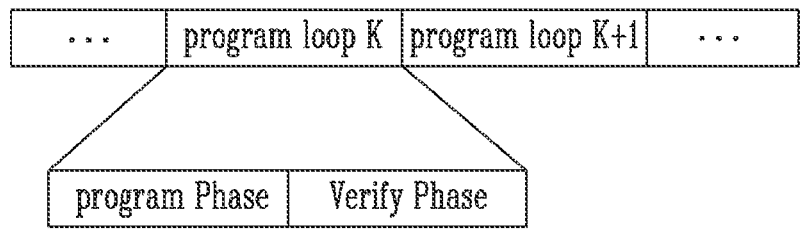
FIG. 3 is a diagram illustrating a program loop in accordance with an embodiment of the present disclosure.

FIG. 3 is a diagram illustrating a program loop in accordance with an embodiment of the present disclosure.

Referring to FIG. 3, a program loop may include a program phase and a verify phase.

The program phase may be a period in which a program voltage is applied to a word line such that a threshold voltage of a selected memory cell is included in a target program state. The program phase may be a period for allowing a program state of the selected memory cell to become the target program state. The program phase may be a period for applying a program voltage Vpgm to a selected word line and applying a pass voltage Vpass to an unselected word line.

The verify phase may be a period in which the program state of the selected memory cell has reached the target program state after the program phase. The verify phase may include a period for sensing a bit line. In the verify phase, the sensing circuit 126 may generate a reference current in response to the allow bit signal VRYBIT and may output a pass signal PASS or a fail signal FAIL by comparing a sensing voltage VPB received from the page buffer group 123 with a reference voltage generated by the reference current. The sensing circuit 126 may output the pass signal PASS or the fail signal FAIL by comparing a sensing current IPB received from the page buffer group with the reference current. Although it has been described that the sensing circuit 126 compares the sensing voltage VPB with the reference voltage, the sensing circuit may output the pass signal PASS or the fail signal FAIL by comparing the sensing current IPB with the reference current.

In an embodiment, when verification on the fifth program state P5 passes before a Kth program loop, the Kth program loop and program loops that occur after the Kth program loop may be program loops for forming a program state (e.g., the sixth program state P6) that occurs after the fifth program state P5. That is, memory cells of which target program state is the fifth program state P5 are in a program inhibit state and might not be programmed from the Kth program loop. In addition, memory cells of which target program state is a program state that occurs after the fifth program state P5 may be programmed. For example, memory cells of which target program state is the sixth program state P6 or the seventh program state P7 may be programmed in the Kth program loop and program loops that occur after the Kth program loop. In addition, a verify operation on the sixth program state P6 or the seventh program state P7 may be performed in the Kth program loop.

Figure 4:
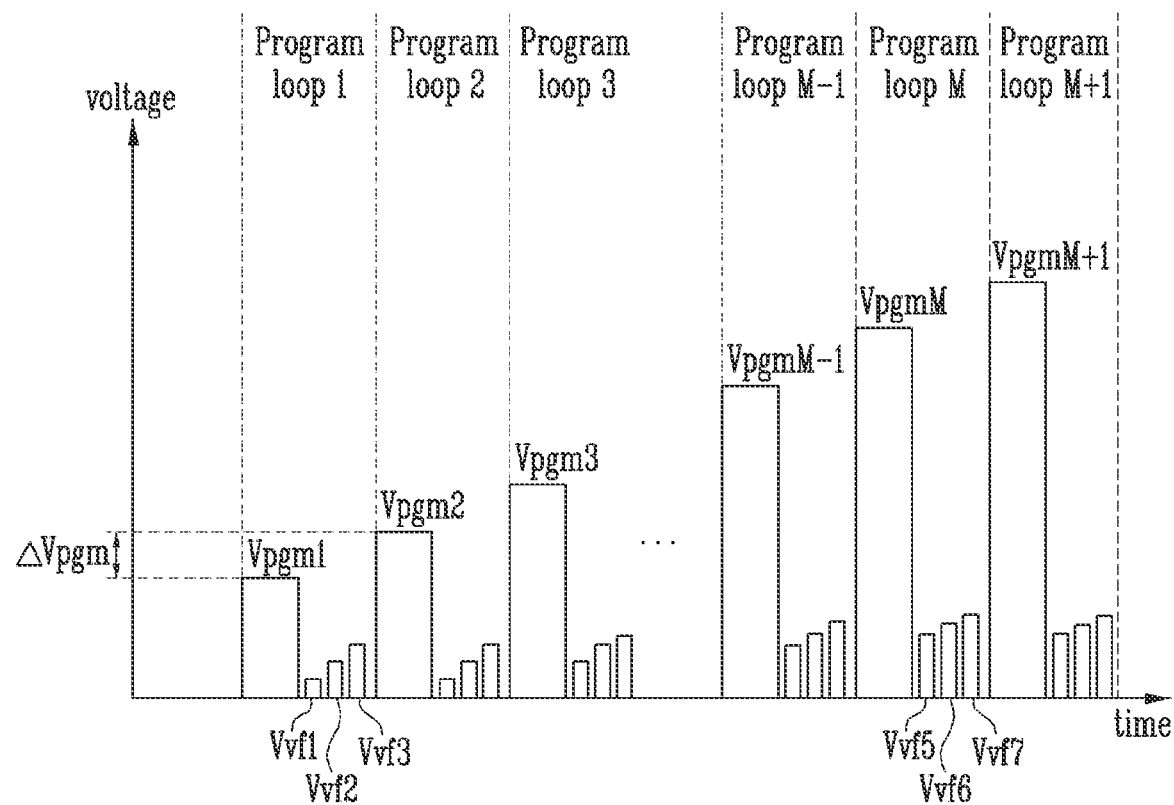
FIG. 4 is a diagram illustrating a program operation in accordance with an embodiment of the present disclosure.

FIG. 4 is a diagram illustrating a program operation in accordance with an embodiment of the present disclosure.

Referring to FIG. 4, a program operation for forming a plurality of program states may include a plurality of program loops. Each program loop may include a program voltage apply operation of applying a program voltage to a selected word line and a verify voltage apply operation of applying a verify voltage to the selected word line. The operation of applying the program voltage may be included in the program phase, and the operation of applying the verify voltage may be included in the verify phase. The program voltage apply operation may be an operation of increasing a threshold voltage of a memory cell, and the verify voltage apply operation may be an operation of determining a threshold voltage of a memory cell, thereby checking whether the program state of the corresponding memory cell has reached a target program state. For example, a first program loop may include an operation of applying a first program voltage Vpgm1 and a plurality of verify voltages Vvf1 to Vvf3 to a selected word line. For convenience of description, it is illustrated that three verify voltages are applied in all program loops. However, the number of verify voltages applied per program loop is not limited thereto, and a varying number of verify voltages may be applied.

As a program loop is sequentially performed, a program voltage may increase by a step voltage $\Delta Vpgm$. This is referred to as an Incremental Step Pulse Programming (ISPP) method. For example, a second program voltage Vpgm2 applied to the selected word line in a second program loop may be a voltage increasing by the step voltage $\Delta Vpgm$ as compared with the first program voltage Vpgm1.

A memory cell of which program state has reached the target program state while the plurality of program loops are performed may be in the program inhibit state such that a program operation is not performed any more. Although a subsequent program loop is performed, a threshold voltage of the memory cell that is in the program inhibit state may be maintained. For example, a memory cells that has been completely programmed to the first program state P1 as the target program state in the second program loop may be in the program inhibit state in a third program loop. In an embodiment, a bit line of the memory cell of which program state has reached the target program state may be precharged to a program inhibit voltage. When the bit line is precharged to the program inhibit voltage, a channel of the memory cell is boosted by the program voltage, and the memory cell might not be programmed.

Figure 5:
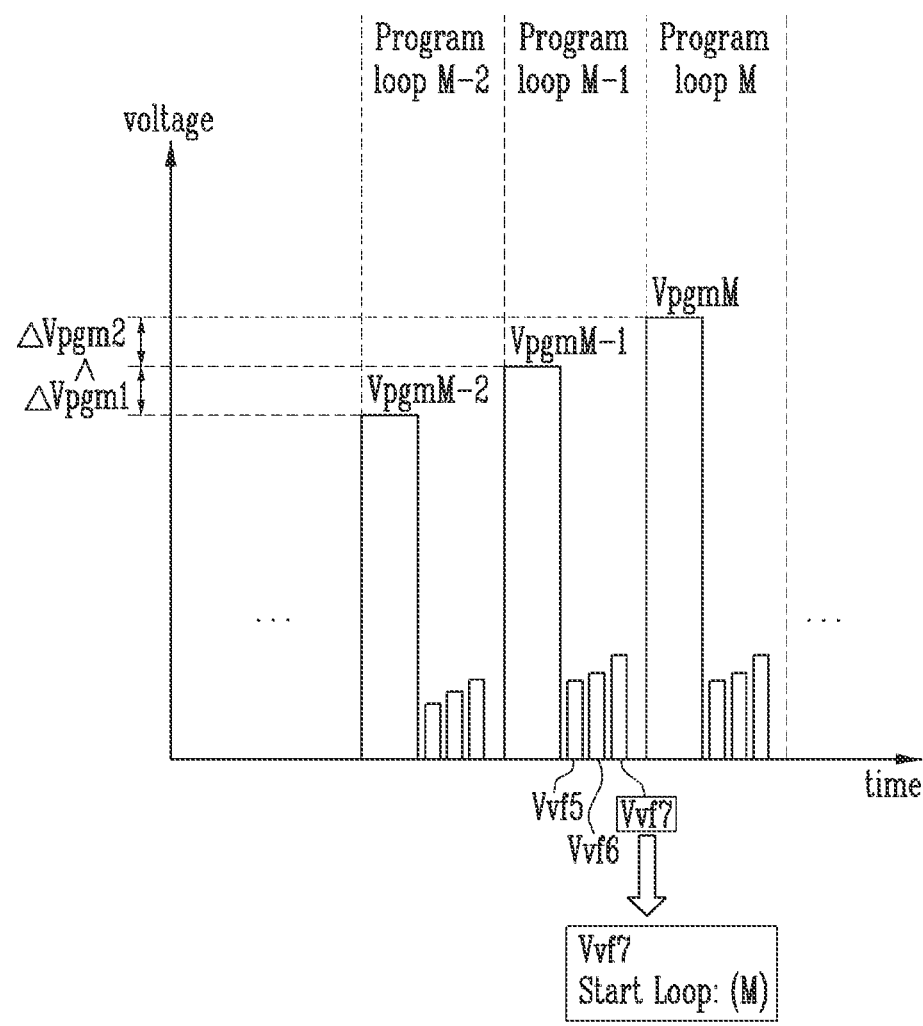
FIG. 5 is a diagram illustrating a program operation of the memory device in accordance with an embodiment of the present disclosure.

FIG. 5 is a diagram illustrating a program operation of the memory device in accordance with an embodiment of the present disclosure.

Referring to FIGS. 1 and 5, the memory device 100 may perform a program operation according to an Incremental Step Pulse Programming (ISPP) method in which a program voltage increases by a step voltage. Specifically, in the memory device 100, an (M−1)th program voltage VpgmM−1 applied to a selected word line in an (M−1)th program loop may be a voltage increasing by a first step voltage $\Delta Vpgm1$ as compared with an (M−2)th program voltage VpgmM−2.

Also, in the memory device 100, an Mth program voltage VpgmM applied to the selected word line in an Mth program loop may be a voltage increasing by a second step voltage $\Delta Vpgm2$ as compared with the (M−1)th program voltage VpgmM−1.

In accordance with an embodiment of the present disclosure, the memory device 100 may apply a program voltage increasing by the second step voltage $\Delta Vpgm2$ that is lower than the first step voltage $\Delta Vpgm1$ from a program loop, among a plurality of program loops, for verifying a program state having a highest threshold voltage.

For example, a highest program state of a selected memory cell may be the seventh program state P7, and the seventh verify voltage Vvf7 for verifying the seventh program state P7 may be applied from the Mth program loop. The memory device 100 may apply the program voltage increasing by the second step voltage $\Delta Vpgm2$ lower than the first step voltage $\Delta Vpgm1$ from the Mth program loop as the program loop, among the plurality of program loops, for verifying the seventh program state P7 having a highest threshold voltage.

Program loops in which a program voltage increasing by the first step voltage $\Delta Vpgm1$ as compared with a program voltage of a previous program loop is applied may be defined as program loops in a first state. In addition, program loops in which a program voltage increasing by the second step voltage $\Delta Vpgm2$ as compared with a program voltage of a previous program loop is applied may be defined as program loops in a second state.

That is, when it is predicted that a verify voltage for verifying a program state having a highest threshold voltage will be applied in the Mth program loop, the control logic 130 shown in FIG. 1 may control the peripheral circuit 120 to apply, in the Mth loop, a program voltage increasing by the second step voltage as compared with a program voltage applied in the (M−1)th program loop.

Figure 6:
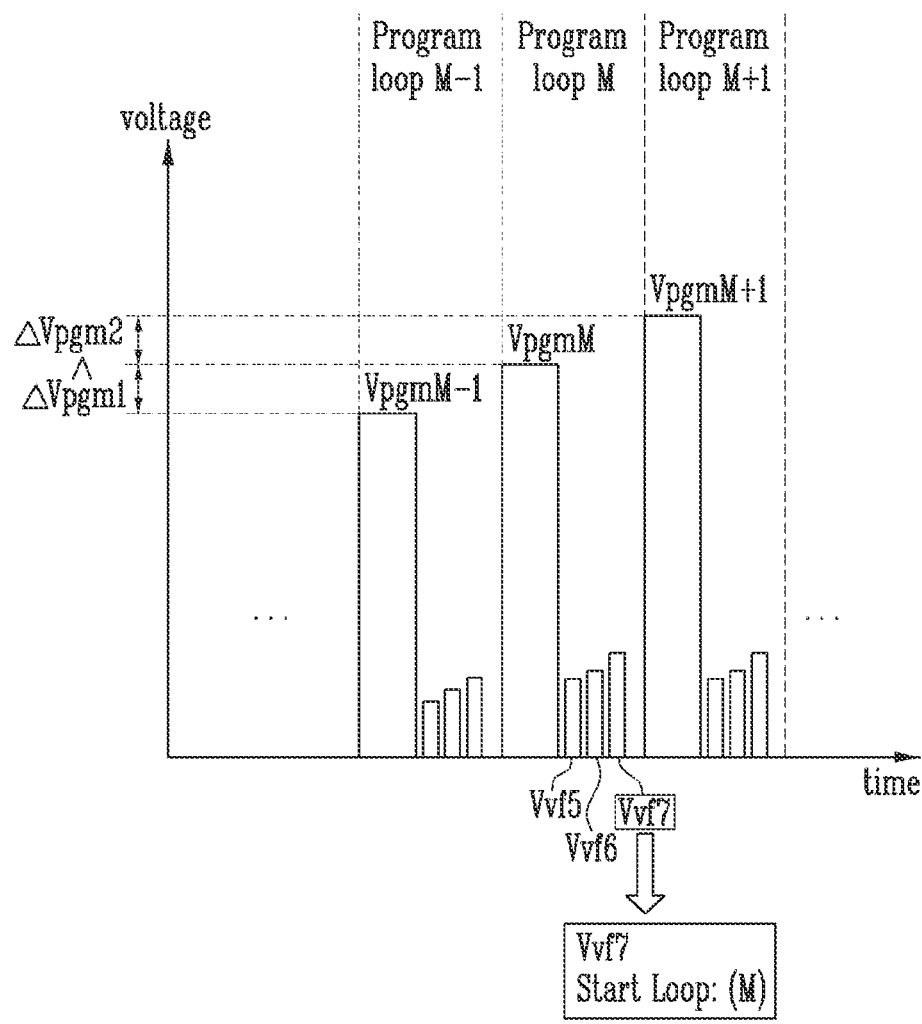
FIG. 6 is a diagram illustrating a program operation of the memory device in accordance with another embodiment of the present disclosure.

FIG. 6 is a diagram illustrating a program operation of the memory device in accordance with another embodiment of the present disclosure.

Referring to FIGS. 1 and 6, the memory device 100 may perform a program operation according to an Incremental Step Pulse Programming (ISPP) method in which a program voltage increases by a step voltage. Specifically, in the memory device 100, an Mth program voltage VpgmM applied to a selected word line in an Mth program loop may be a voltage increasing by a first step voltage ΔVpgm1 as compared with an (M−1)th program voltage VpgmM−1.

Also, in the memory device 100, an (M+1)th program voltage VpgmM+1 applied to the selected word line in an (M+1)th program loop may be a voltage increasing by a second step voltage ΔVpgm2 as compared with the Mth program voltage VpgmM.

In accordance with an embodiment of the present disclosure, the memory device 100 may apply a program voltage increasing by the second step voltage ΔVpgm2 lower than the first step voltage ΔVpgm1 from a program loop that occurs after a program loop, among a plurality of program loops, for verifying a program state having a highest threshold voltage.

For example, a highest program state of a selected memory cell may be the seventh program state P7, and the seventh verify voltage Vvf7 for verifying the seventh program state P7 may be applied from the Mth program loop. The memory device 100 may apply the program voltage increasing by the second step voltage ΔVpgm2 lower than the first step voltage ΔVpgm1 from the (M+1)th program loop as a next program loop of the program loop, among the plurality of program loops, for verifying the seventh program state P7 having a highest threshold voltage.

Program loops in which a program voltage increasing by the first step voltage ΔVpgm1 as compared with a program voltage of a previous program loop is applied may be defined as program loops in a first state. In addition, program loops in which a program voltage increasing by the second step voltage ΔVpgm2 as compared with a program voltage of a previous program loop is applied may be defined as program loops in a second state.

That is, when it is checked that a verify voltage for verifying a program state having a highest threshold voltage has been applied in the Mth program loop, the control logic 130, shown in FIG. 1 may control the peripheral circuit 120 to apply, in the (M−1)th program loop, a program voltage increasing by the second step voltage as compared with a program voltage applied in the Mth program loop.

Figure 7:
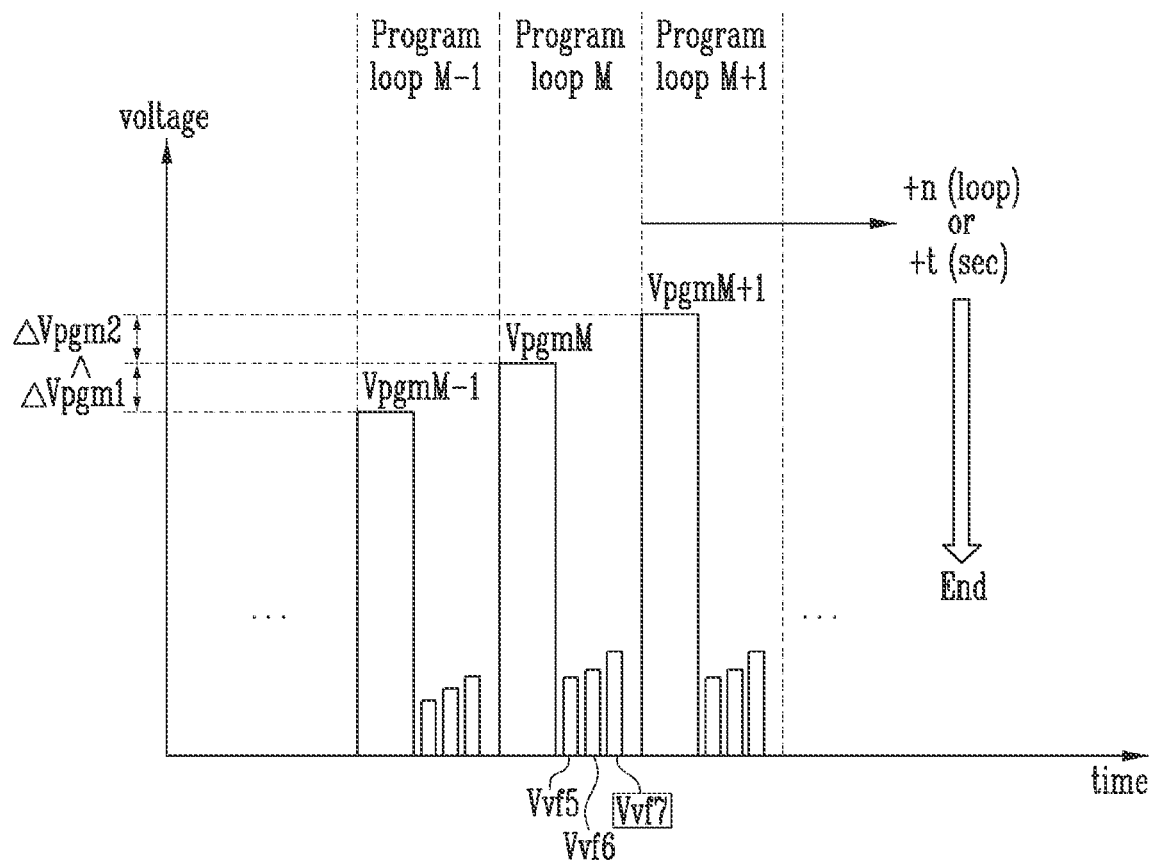
FIG. 7 is a diagram illustrating an end of a program operation of the memory device in accordance with an embodiment of the present disclosure.

FIG. 7 is a diagram illustrating an end of a program operation of the memory device in accordance with an embodiment of the present disclosure.

Referring to FIGS. 1 and 7, in an embodiment of the present disclosure, the memory device 100 may end a program operation after a predetermined time, the predetermined time starting from a time at which a program loop in which a program voltage increasing by a second step voltage is applied is started. In an embodiment, when a highest threshold voltage is the seventh program state P7, although not shown in FIG. 7, the memory device 100 may end the program operation after the predetermined time (e.g., t seconds), when a program loop in which the seventh verify voltage Vvf7 for verifying the seventh program state P7 is applied is started. Alternatively, as shown in FIG. 7, in another embodiment, the memory device 100 may end the program operation after the predetermined time (e.g., the t seconds) when a next program loop of the program loop in which the seventh verify voltage Vvf7 for verifying the seventh program state P7 is applied is started.

That is, the control logic 130, shown in FIG. 1 may control the peripheral circuit 120 to end the program operation after the predetermined time, the predetermined time starting from the time at which the program loop in which the program voltage increasing by the second step voltage is applied is started. For example, when the program loop in which the program voltage increasing by the second step voltage is applied is started, the control logic 130 may control the peripheral circuit 120 to end the program operation after the t seconds.

In another embodiment of the present disclosure, the memory device 100 may end a program operation after a predetermined number of program loops from a time at which a program loop in which a program voltage increasing by a second step voltage is applied is started. In an embodiment, when a highest threshold voltage is the seventh program state P7, although not shown in FIG. 7, the memory device 100 may end the program operation after the predetermined number of program loops (e.g., n program loops) when a program loop in which the seventh verify voltage Vvf7 for verifying the seventh program state P7 is applied is started. That is, when a verify voltage for verifying a highest program state is applied in an Mth program loop, the memory device 100 may perform n program loops from a time at which the Mth program loop is performed and may end the program operation. Alternatively, as shown in FIG. 7, in another embodiment, the memory device 100 may end the program operation after the predetermined number of program loops (e.g., the n program loops) when a next program loop of the program loop in which the seventh verify voltage Vvf7 for verifying the seventh program state P7 is applied is started. That is, when the verify voltage for verifying the highest program state is applied in the Mth program loop, the memory device 100 may perform n program loops from a time at which an (M+1)th program loop is performed and may end the program operation.

That is, the control logic 130, shown in FIG. 1, may control the peripheral circuit 120 to end the program operation after the predetermined program loop number from the time at which the program loop in which the program voltage increasing by the second step voltage is applied is started. For example, when the program loop in which the program voltage increasing by the second step voltage is applied is started, the control logic 130 may control the peripheral circuit 120 to end the program operation after the n program loops.

Figure 8:
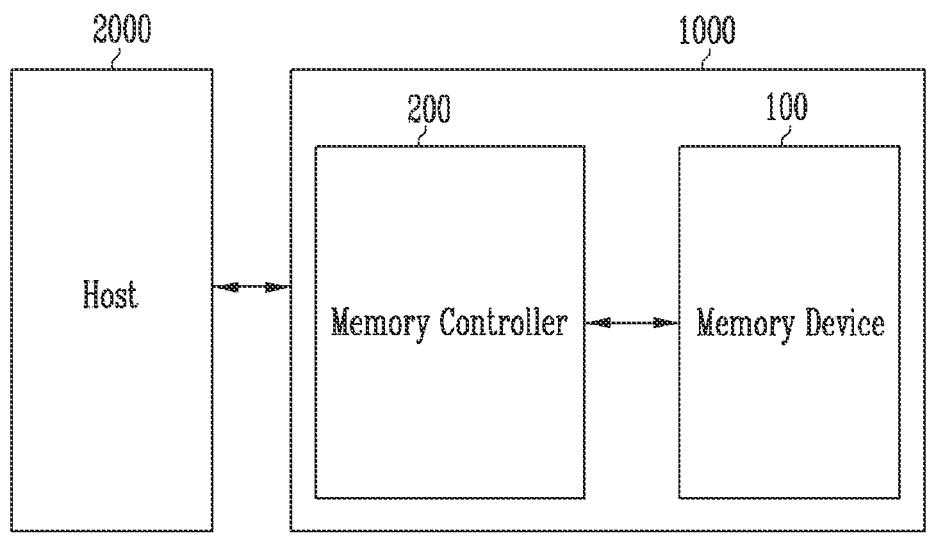
FIG. 8 is a block diagram illustrating a storage device in accordance with an embodiment of the present disclosure.

FIG. 8 is a block diagram illustrating a storage device in accordance with an embodiment of the present disclosure.

Referring to FIG. 8, the storage device 1000 may include a memory device 100 and a memory controller 200.

The storage device 1000 may be a device for storing data under the control of a host 2000, such as a mobile phone, a smart phone, an MP3 player, a laptop computer, a desktop computer, a game console, a display device, a tablet PC or an in-vehicle infotainment.

The storage device 1000 may be implemented as any one of various types of storage devices according to a host interface that is a communication scheme with the host 2000.

The storage device 1000 may be implemented as any one of various kinds of package types.

The memory device 100 may store data or use stored data. In an embodiment, the memory device 100 may be the memory device 100 shown in FIG. 1. Specifically, the memory device 100 operates under the control of the memory controller 200. Also, the memory device 100 may include a plurality of memory dies, and each of the plurality of memory dies may include a memory cell array including a plurality of memory cells for storing data. The memory cell array may include a plurality of memory blocks. Each memory block may include a plurality of memory cells, and one memory block may include a plurality of pages. The page may be a unit for storing data in the memory device 100 or reading data stored in the memory device 100. The memory device 100 may be a nonvolatile memory device or a volatile memory device. In this specification, for convenience of description, a case where the memory device 100 is a NAND flash memory is assumed and described.

The memory device 100 may receive a command and an address from the memory controller 200. The memory device 100 may access an area selected by the received address in the memory cell array. That the memory device 100 accesses the selected area may mean that the memory device 100 performs an operation corresponding to the received command on the selected area. For example, the memory device 100 may perform a write operation (program operation), a read operation, and an erase operation. The program operation may be an operation in which the memory device 100 records data in the area selected by the address. The read operation may mean an operation in which the memory device 100 reads data from the area selected by the address. The erase operation may mean an operation in which the memory device 100 erases data stored in the area selected by the address.

In accordance with an embodiment of the present disclosure, the memory device 100 may perform a program operation while increasing a program voltage applied to selected memory cells by a step voltage. Also, the memory device 100 may decrease a magnitude of the increasing program voltage, when a predetermined condition is satisfied. That is, the memory device 100 may decrease the magnitude of the step voltage. For example, the memory device 100 may determine a program voltage applied in each program loop, based on when a verify operation of verifying a program state having a highest threshold voltage, among a plurality of program states is performed. For example, the memory device 100 may determine a program voltage such that a program voltage increasing by a first step voltage as compared with a program voltage in a previous program loop is applied or such that a program voltage increasing by a second step voltage as compared with the program voltage in the previous program loop is applied. The second step voltage may be lower than the first step voltage. A program loop in which the first step voltage is applied may be defined as a program loop in a first state, and a program loop in which the second step voltage is applied may be defined as a program loop in a second state.

In accordance with an embodiment of the present disclosure, the memory device 100 may decrease the magnitude of the increasing program voltage (e.g., the step voltage) from a program loop for verifying a program state having a highest threshold voltage, to control a right tail of a threshold voltage distribution of memory cells not to excessively increase.

The memory controller 200 may control overall operations of the storage device 1000. Specifically, when power is applied to the storage device 1000, the memory controller 200 may execute firmware (FW). The FW may include a Host Interface Layer (HIL) that receives a request input from the host 2000 or outputs a response to the host 2000, a Flash Translation Layer (FTL) that manages an operation between an interface of the host 2000 and an interface of the memory device 100, and a Flash Interface Layer (FIL) that provides a command to the memory device 100 or receives a response from the memory device 100.

The memory controller 200 may receive data and a Logical Address (LA) from the host 2000 and may translate the LA into a Physical Address (PA) representing an address of memory cells in which data included in the memory device 100 is to be stored. The LA may be a Logical Block Address (LBA), and the PA may be a Physical Block Address (PBA).

The memory controller 200 may control the memory device 100 to perform a program operation, a read operation, an erase operation, or the like in response to a request from the host 2000. In the program operation, when a write request is received from the host 2000, the memory controller 200 may control the memory device 100 to perform a program operation corresponding to the write request. More specifically, the memory controller 200 may provide the memory device 100 with a program command, a PBA, and data.

The memory controller 200 may control the memory device 100 to autonomously perform a program operation, a read operation, or an erase operation, regardless of any request from the host 2000. For example, the memory controller 200 may control the memory device 100 to perform a program operation, a read operation, or an erase operation, which is used to perform a background operation, such as wear leveling, garbage collection, or read reclaim.

The host 2000 may communicate with the storage device 1000 by using at least one of various communication schemes.

Figure 9:
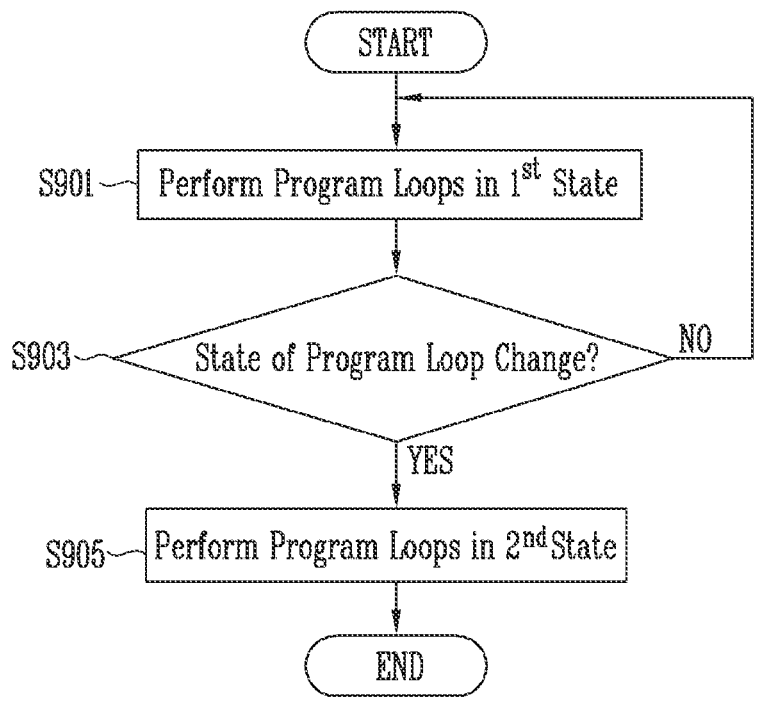
FIG. 9 is a flowchart illustrating an operating method of the memory device in accordance with an embodiment of the present disclosure.

FIG. 9 is a flowchart illustrating an operating method of the memory device in accordance with an embodiment of the present disclosure.

Referring to FIG. 9, in step S901, the memory device may perform program loops in a first state. Each of the program loops may include a program voltage apply operation of applying a program voltage to selected memory cells and a verify operation of verifying a program state of the selected memory cells. Each of the program loops in the first state may be a program loop in which a program voltage increasing by a first step voltage as compared with a program voltage of a previous program loop.

In step S903, the memory device may check whether a state of a program loop has been changed. That is, the memory device may check whether a program loop to be performed next is a program loop in a second state instead of a program loop in the first state. Whether the state of the program loop has been changed to the second state may be determined based on when a verify operation on a program state having a highest threshold voltage, among a plurality of program states is performed.

When it is checked that the state of the program loop has not been changed in the step S903, the memory device may return to the step S901 to perform the program loops in the first state. When it is checked that the state of the program loop has been changed in the step S903, the memory device may perform program loops in the second state in step S905. Each of the program loops in the second state may also include a program voltage apply operation of applying a program voltage to selected memory cells and a verify operation of verifying a program state of the selected memory cells. Each of the program loops in the second state may be a program loop in which a program voltage increasing by a second step voltage as compared with a program voltage of a previous program loop is applied. A magnitude of the second step voltage may be smaller than a magnitude of the first step voltage.

That is, the program loops in the second state may be performed after the program loops in the first state.

Figure 10:
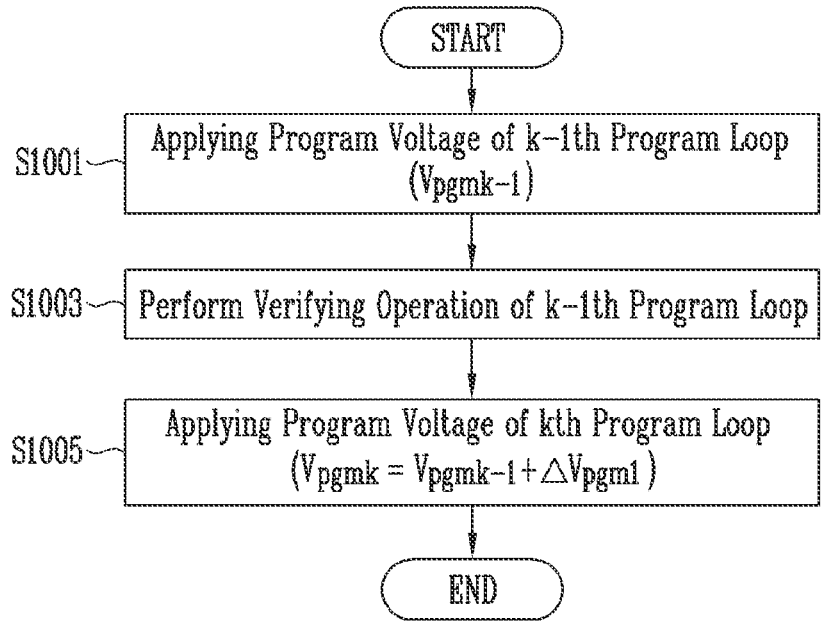
FIG. 10 is a flowchart illustrating in more detail an embodiment of step S901 shown in FIG. 9.

FIG. 10 is a flowchart illustrating in more detail an embodiment of the step S901, shown in FIG. 9.

That is, FIG. 10 is a flowchart illustrating in more detail the program loop in the first state, which is shown in FIG. 9.

Referring to FIG. 10, in step S1001, the memory device may apply a program voltage Vpgmk−1 corresponding to a (k−1)th program loop to a selected memory cell.

Next, in step S1003, the memory device may perform a verify operation of verifying a program state of the selected memory cell. The verify operation may be performed on at least some program states, among a plurality of program states, to which the selected memory cell is to be programmed.

Next, in step S1005, the memory device may apply a program voltage Vpgmk corresponding to a kth program loop to the selected memory cell. The program voltage Vpgmk corresponding to the kth program loop may be a value obtained by adding a first step voltage ΔVpgm1 to the program voltage Vpgmk−1 corresponding to the (k−1)th program loop.

Figure 11:
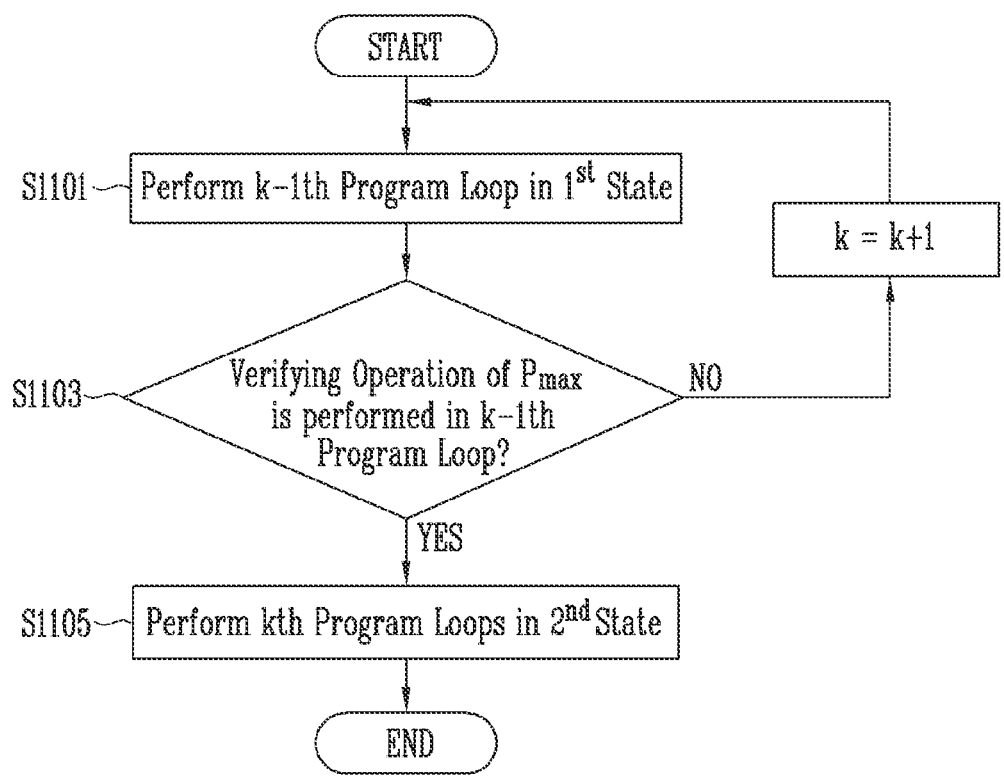
FIG. 11 is a flowchart illustrating in more detail an embodiment of step S903 shown in FIG. 9.

FIG. 11 is a flowchart illustrating in more detail an embodiment of the step S903, shown in FIG. 9.

Referring to FIG. 11, in step S1101, the memory device may perform the (k−1)th program loop. The step S1101 may be the program loop in the first state, which is described in FIGS. 9 and 10.

In step S1103, the memory device may determine whether a verify operation on a highest program state Pmax has been performed in the (k−1)th program loop.

When it is determined that the verify operation on the highest program state Pmax has not been performed in the (k−1)th program loop, the memory device may return to the step S1101 to perform the program loop in the first state.

When it is determined that the verify operation on the highest program state Pmax has been performed in the (k−1)th program loop, the memory device may perform program loops in the second state in step S1105.

Figure 12:
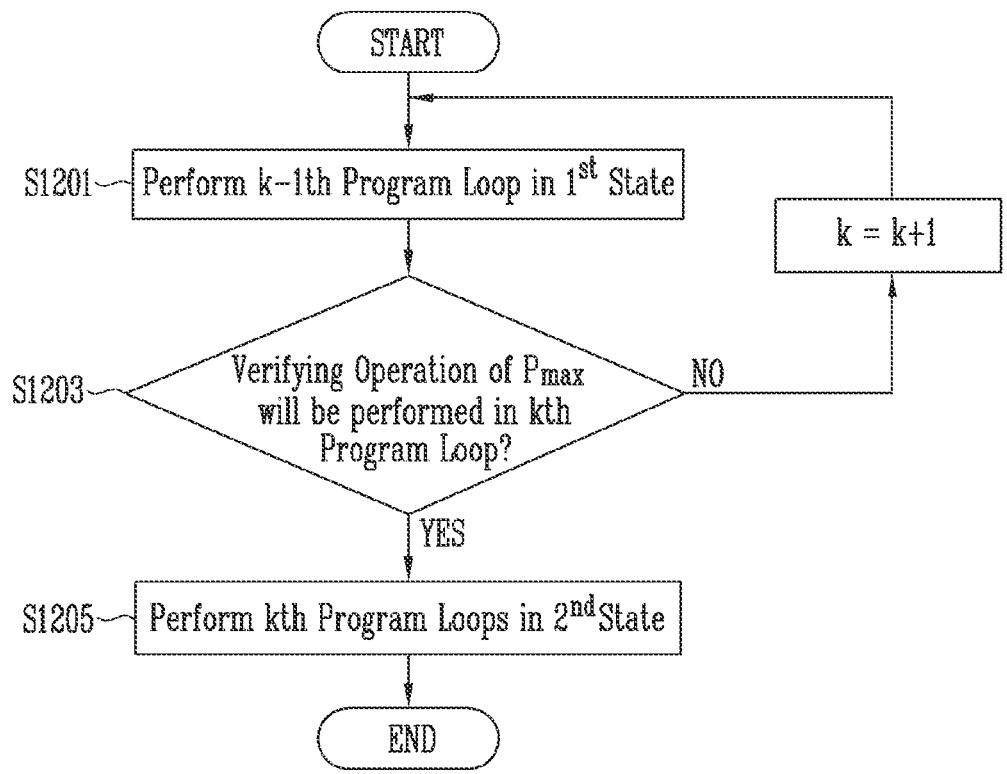
FIG. 12 is a flowchart illustrating in more detail another embodiment of the step S903 shown in FIG. 9.

FIG. 12 is a flowchart illustrating in more detail another embodiment of the step S903 shown in FIG. 9.

Referring to FIG. 12, in step S1201, the memory device may perform the (k−1)th program loop. The step S1201 may be the program loop in the first state, which is described in FIGS. 9 and 10.

In step S1203, the memory device may determine whether the verify operation on the highest program state Pmax is to be performed in the kth program loop.

When it is determined that the verify operation on the highest program state Pmax is not to be performed in the kth program loop, the memory device may return to the step S1201 to perform the program loop in the first state.

When it is determined that the verify operation on the highest program state Pmax is to be performed in the kth program loop, the memory device may perform the program loops in the second state in step S1205.

Figure 13:
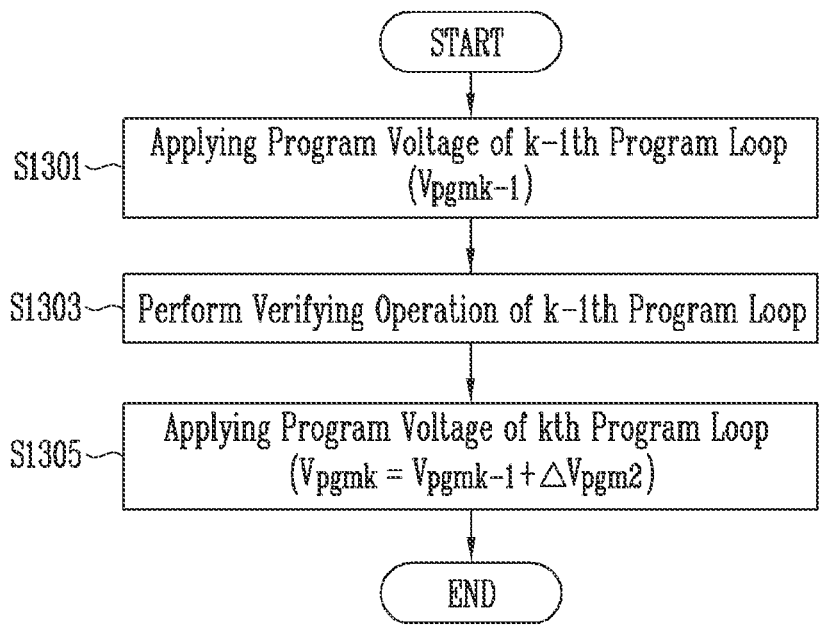
FIG. 13 is a flowchart illustrating in more detail an embodiment of step S905 shown in FIG. 9.

FIG. 13 is a flowchart illustrating in more detail an embodiment of step S905, shown in FIG. 9.

That is, FIG. 13 is a flowchart illustrating in more detail the program loop in the second state, which is shown in FIG. 9.

Referring to FIG. 13, in step S1301, the memory device may apply a program voltage Vpgmk−1 corresponding to the (k−1)th program loop to a selected memory cell.

Next, in step S1303, the memory device may perform a verify operation of verifying a program state of the selected memory cell. The verify operation may be performed on at least some program states, among a plurality of program states, to which the selected memory cell is to be programmed.

Next, in step S1305, the memory device may apply a program voltage Vpgmk corresponding to the kth program loop to the selected memory cell. The program voltage Vpgmk corresponding to the kth program loop may be a value obtained by adding a second step voltage ΔVpgm2 to the program voltage Vpgmk−1 corresponding to the (k−1)th program loop. The second step voltage ΔVpgm2 may be a value smaller than a value of the first step voltage ΔVpgm1 of the first program state.

In accordance with the present disclosure, there can be provided a memory device, a storage device including the same, and an operating method of the memory device, which support a program method in which a sufficient margin of a pass voltage can be secured.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made based on the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made based on the technological scope of the present disclosure in addition to the embodiments disclosed herein.

What is claimed is:

1. A memory device comprising:
a plurality of memory cells;
a peripheral circuit configured to perform a plurality of program loops each including a program voltage apply operation of applying a program voltage to selected memory cells, among the plurality of memory cells, and a verify operation of verifying a program state of the selected memory cells; and
a control logic configured to control the peripheral circuit to apply program voltages increasing in a step-wise manner by a first step voltage in program loops in a first state, among the plurality of program loops, and increasing in a step-wise manner by a second step voltage in program loops in a second state that occur after the program loops in the first state,
wherein the second step voltage is lower than the first step voltage, and wherein the first state and the second state of the program loops are determined based on when a verify operation on a program state having a highest threshold voltage is performed.

2. The memory device of claim 1, wherein the control logic counts a program loop number based on a number of times the program voltage is applied.

3. The memory device of claim 1, wherein the control logic monitors a program loop number in which a verify voltage for verifying each of a plurality of program states of the selected memory cells is first applied.

4. The memory device of claim 1, wherein the control logic monitors whether a verify operation on each of a plurality of program states of the selected memory cells has passed.

5. The memory device of claim 1, wherein, when a verify operation on the program state having the highest threshold voltage is performed in an nth program loop, among the program loops, the program loops are determined as program loops from the nth program loop to the program loop in the second state.

6. The memory device of claim 1, wherein, when a verify operation on the program state having the highest threshold voltage is performed in an nth program loop, among the program loops, the program loops are determined as program loops from an (n+1)th program loop to the program loop in the second state.

7. The memory device of claim 1, wherein the control logic controls the peripheral circuit to end a program operation after a predetermined time, the predetermined time starting from a time at which the program loop in the second state is started.

8. The memory device of claim 1, wherein the control logic controls the peripheral circuit to end a program operation after a predetermined number of program loops from a time at which the program loop in the second state is started.

9. The memory device of claim 1, wherein the peripheral circuit further includes a voltage generator configured to generate the program voltage and a verify voltage for verifying the program state.

10. A storage device comprising:
a memory controller configured to control a memory device to perform a program operation, corresponding to a write request, when the write request is received from a host; and
the memory device including a plurality of memory cells, the memory device performing the program operation by performing a plurality of program loops each including a program voltage apply operation of applying a program voltage to selected memory cells, among the plurality of memory cells, and a verify operation of verifying a program state of the selected memory cells,
wherein the program loops are determined as program loops in a first state or a second state, based on when a verify operation on a program state having a highest threshold voltage is performed,
wherein program voltages applied in the first state increase in a step-wise manner by a first step voltage,
wherein program voltages applied in the second state increase in a step-wise manner by a second step voltage that is lower than the first step voltage, and
wherein the program loops in the second state are performed after the program loops in the first state.

11. The storage device of claim 10, wherein the memory device counts a program loop number based on a number of times the program voltage is applied.

12. The storage device of claim 10, wherein the memory device monitors a program loop number in which a verify voltage for verifying each of a plurality of program states of the selected memory cells is first applied.

13. The storage device of claim 10, wherein the memory device monitors whether a verify operation on each of a plurality of program states of the selected memory cells has passed.

14. The storage device of claim 10, wherein, when a verify operation on the program state having the highest threshold voltage is performed in an nth program loop, among the program loops, the memory device performs program loops from the nth program loop to the program loop in the second state.

15. The storage device of claim 10, wherein, when a verify operation on the program state having the highest threshold voltage is performed in an nth program loop, among the program loops, the memory device performs program loops from an (n+1)th program loop to the program loop in the second state.

16. The storage device of claim 10, wherein the memory device ends a program operation after a predetermined time, the predetermined time starting from a time at which the program loop in the second state is started.

17. The storage device of claim 10, wherein the memory device ends a program operation after a predetermined number of program loops from a time at which the program loop in the second state is started.

18. A method of operating a memory device, the method comprising:
applying a first program voltage of a first program loop to selected memory cells, among a plurality of memory cells, the first program voltage increasing by a first step voltage as compared with a previous program voltage of a previous program loop;
performing a verify operation of verifying at least some of a plurality of program states of the selected memory cells; and
applying a second program voltage to the selected memory cells, among the plurality of memory cells, the second program voltage increasing by a second step voltage as compared with the first program voltage of the first program loop, based on when a verify operation on a program state having a highest threshold voltage, among the plurality of program states is performed,
wherein the second step voltage is lower than the first step voltage.

19. The method of claim 18, wherein, in the applying of the second program voltage increasing by the second step voltage, program loops are performed from an nth program loop, among a plurality of program loops, on the selected memory cells when a verify operation on the program state having the highest threshold voltage is performed in the nth program loop.

20. The method of claim 18, wherein, in the applying of the second program voltage increasing by the second step voltage, program loops are performed from an (n+1)th program loop, among a plurality of program loops, on the selected memory cells when a verify operation on the program state having the highest threshold voltage is performed in an nth program loop, among the plurality of program loops.

* * * * *